United States Patent
Gross et al.

(10) Patent No.: US 7,275,016 B2
(45) Date of Patent: Sep. 25, 2007

(54) METHOD AND SYSTEM FOR PROVIDING PROBLEM IDENTIFICATION AND TROUBLE-SHOOTING SERVICES

(75) Inventors: Wolfgang Gross, Erlangen (DE); Werner Hofler, Eckental (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/637,893

(22) Filed: Aug. 8, 2003

(65) Prior Publication Data

US 2005/0033491 A1 Feb. 10, 2005

(51) Int. Cl.
*G06F 11/30* (2006.01)

(52) U.S. Cl. .................. 702/182; 702/84; 702/185; 700/108

(58) Field of Classification Search .................. 702/33, 702/35, 81, 84, 182, 183, 188, 185; 700/108, 700/110, 121; 705/1, 7, 11
See application file for complete search history.

(56) References Cited

U.S. PATENT DOCUMENTS

| | | | |
|---|---|---|---|
| 5,757,669 A * | 5/1998 | Christie et al. ............. 709/205 |
| 6,263,255 B1 * | 7/2001 | Tan et al. .................... 700/121 |
| 6,621,412 B1 * | 9/2003 | Markle et al. .............. 340/517 |
| 6,735,549 B2 * | 5/2004 | Ridolfo ....................... 702/181 |
| 6,931,386 B2 * | 8/2005 | Yoshihara .................... 706/48 |
| 2001/0037363 A1 | 11/2001 | Battilega et al. |
| 2001/0053940 A1 * | 12/2001 | Horn et al. ................... 700/32 |
| 2002/0007237 A1 | 1/2002 | Phung et al. |
| 2002/0029167 A1 * | 3/2002 | Muller ......................... 705/14 |
| 2002/0035447 A1 | 3/2002 | Takahashi et al. |
| 2002/0052862 A1 * | 5/2002 | Scott et al. .................... 707/1 |
| 2002/0161760 A1 * | 10/2002 | O'Brien ......................... 707/6 |
| 2003/0028525 A1 * | 2/2003 | Santos et al. .................. 707/3 |
| 2003/0033302 A1 * | 2/2003 | Banerjee et al. ............... 707/6 |
| 2003/0163356 A1 * | 8/2003 | Marks et al. .................. 705/7 |
| 2003/0163357 A1 * | 8/2003 | Engleman et al. ............. 705/7 |
| 2004/0039779 A1 * | 2/2004 | Armstrong et al. .......... 709/204 |

OTHER PUBLICATIONS

SiteScape Forum, SiteScape WebWorkZone, "Users Guide" http://sitescape.sea.siemens.com/forum/help/en/admin_tabs/admingetstart_tabs/UserGuide.pdf. Nov. 2002.*

* cited by examiner

*Primary Examiner*—Jeffrey R. West

(57) ABSTRACT

In a complex plant most of the problems or errors will occur only once. Therefore corrective maintenance and trouble-shooting staff can not go back or hark back to ready-made solutions for these problems or errors. The present invention provides a method and a computerized system which enables the corrective maintenance and trouble-shooting staff having access to experiences made on third party plants regarding these problems or errors.

3 Claims, 2 Drawing Sheets

METHOD AND SYSTEM FOR PROVIDING PROBLEM IDENTIFICATION AND TROUBLE-SHOOTING SERVICES

FIELD OF THE INVENTION

The present invention relates in general to a method and a system for providing trouble-services, and in particular to a method and a system for providing trouble-services for defects and errors arising in plants.

BACKGROUND OF THE INVENTION

Production facilities, commonly referred to as plants, continue to increase in complexity due to automation and interconnections between sections of the plant and individual machines within the plant, among other reasons. Furthermore, the hardware and software that directs the machines, and the machines themselves, will often be adjusted to meet changing production demands. Moreover, plant machinery, hardware and software are typically from different suppliers and must be seamlessly integrated for peak plant performance. Coping with this increasing complexity is difficult for corrective maintenance and trouble-shooting staff employees of the plant or maintenance staff employees of suppliers.

US PAP 2002/0035447 A1 discloses a classical system for remote diagnosis as application service.

US PAP 2002/0007237 A1 discloses another conventional method and apparatus to capture diagnostic symptoms and resolution for repair.

US PAP 2001/0037363 A1 discloses another method for providing consulting services to resolve a problem in a centralized web-based environment.

SUMMARY OF THE INVENTION

In a complex plant many problems or errors may occur only once within one plant. Therefore it is difficult for corrective maintenance and trouble-shooting staff to rely on historical or experience-based solutions for these problems or errors. The present invention provides a method and a computerized system which provides the corrective maintenance and trouble-shooting staff access to experiences learnt at third party plants regarding these problems or errors, which occur only once or a limited number of times.

One aspect of the present invention thus involves a method for providing problem identification or trouble-shooting services in third party plants, said method comprising the steps of: providing a forum for collecting solutions for one-time problems or limited-time problems that occurred at the third party plants; classifying the problems; and providing solution services for inquiring third party plants.

Another aspect of the present invention thus involves a computerized system for providing problem identification or trouble-shooting services in third party plants, comprising: at least one server for providing a forum for collecting solutions for problems that occurred at the third party plants; mechanism for classifying of the problems; mechanism for finding solutions to the problems; and mechanism for providing solution services for inquiring third party plants about the problems.

Further aspects, features and advantages of the present invention will become apparent from the drawings and detailed description of the following preferred embodiments.

BRIEF DESCRIPTION OF THE DRAWINGS

The above-mentioned and other concepts of the present invention will now be addressed with reference to the drawings of the preferred embodiments of the present invention. The shown embodiments are intended to illustrate, but not to limit the invention. The drawings contain the following figures, in which like numbers refer to like parts throughout the description and drawings and wherein.

DETAILED DESCRIPTION OF THE PREFERRED EMBODIMENT

Overview

A concept of the invention involves using web-based internet or intranet forums (e.g. discussion forums on special themes) to exchange experiences regarding problems arising in plants and their solutions. Normally, the experience accrued in a plant by trouble-shooting or problem solving will not be shared to other third parties like plant operators, because this knowledge is regarded as an asset and competitive advantage. As used herein the term "third party" means plants, plant suppliers or service delivering companies owned by several owners, which are not necessarily affiliated to each other.

The disclosed invention advantageously employs one or more base concepts. The conventional proprietary way of solving problems and shooting troubles in a plant has disadvantages, especially in complex plants. In a complex plant, most errors and problems occur only once or a limited number of times and are individual cases, so the maintenance staff does not have prior experience in solving these problems. Therefore, trouble-shooting and problem solving becomes time consuming. Furthermore, a specialist may often be requested to solve this problem, since the customer support of a component supplier can only provide problem solution experience dedicated to the failed component. Since the problem solution experience of the maintenance staff of another plant is not available to the maintenance staff of the plant at which a problem occurred, the maintenance staff has to reinvent the solution of the problem every time. The invention offers the advantage, that problem solving and trouble-shooting experience in a plant can be shared between third parties, which will decrease the efforts and shorten the time for fixing problems, which already occurred in another plant. Another advantage of the invention is that the problems are no longer individual and isolated cases and that therefore anticipatory statistical methods can be applied to forecast potential errors and failures in a plant. For example statistical diagnosis and statistical process control (SPC). This is possible, because by the consideration of many plants enough statistical relevant data can be accrued.

Another concept of the invention is that the forum automatically contacts the third party plants to ask for information to identify or solve a problem. This enables the problem identification and solution can be accomplished without interaction of any human being. Furthermore this concept enables the saving of resources.

Those skilled in the art will readily understand the invention can be applied to plants, plant sections (e.g. test fields), plant components (e.g. assembly lines or production lines), plant units (e.g. pumps, squeezer, compressors or machines). Furthermore those skilled in the art will readily understand the invention can be used in production industries, manufacturing industries, continuous industries, process industries and batch processing industries.

Figure 1:
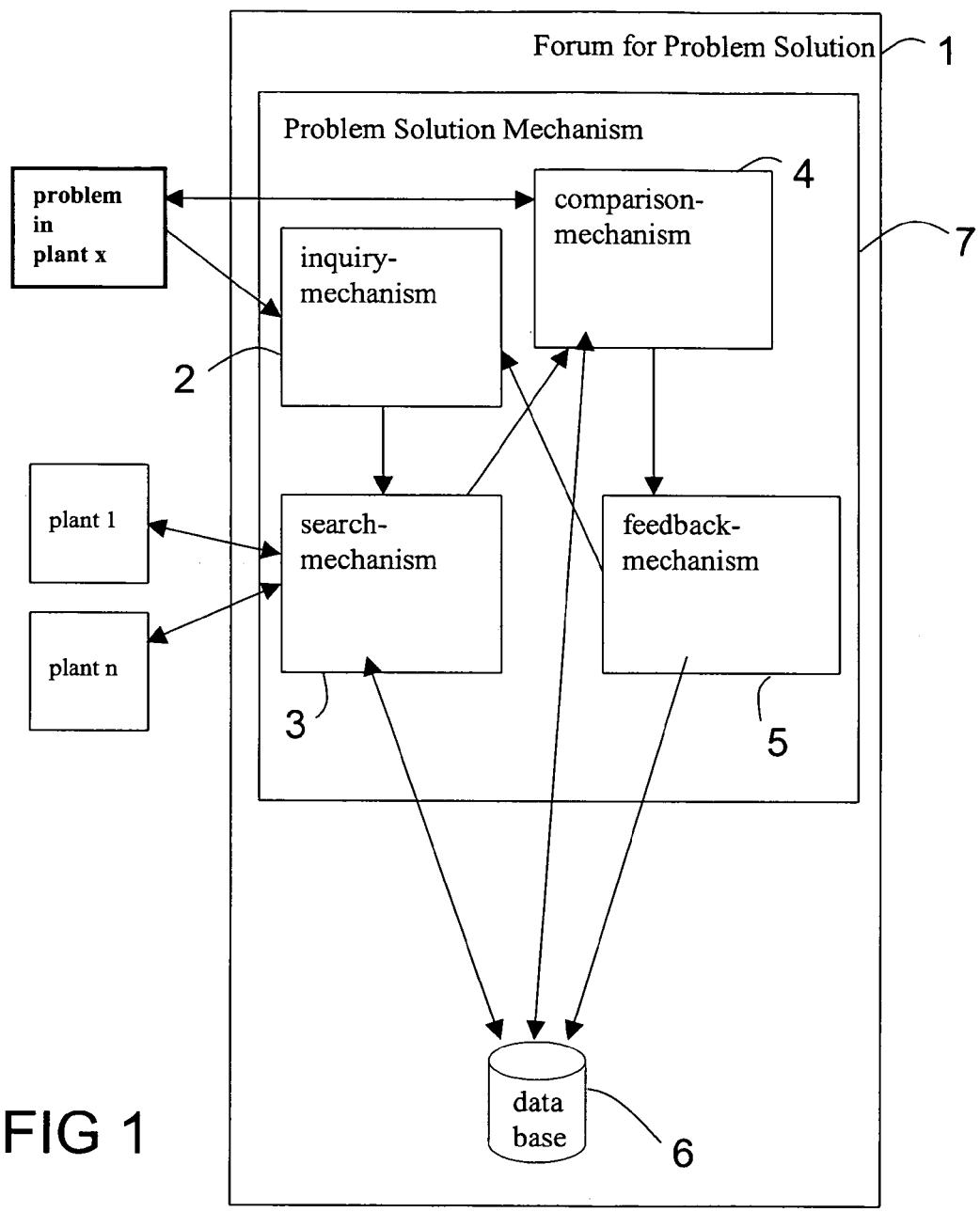
FIG. 1 is a schematic diagram of the present invention, showing an embodiment of the invention.

FIG. 1 shows one embodiment of the invention. Those skilled in the art will readily understand that other embodiments are conceivable and may include more, less or different components. The plant x, which requires a solution for an problem occurred, files an inquiry at the inquiry-mechanism 2 of the forum for problem solution 1. Besides the inquiry-mechanism 2, the forum for problem solution 1 comprises a search-mechanism 3, a comparison-mechanism 4, and optionally a feedback-mechanism 5. Furthermore the forum for problem solution 1 has access to one or more databases to store problem patterns and solutions, among others. The inquiry-mechanism 2, the search-mechanism 3, the comparison-mechanism 4, and (if applicable) the feedback-mechanism 5 compose the problem solution mechanism 7. Those skilled in the art will readily understand that each of these mechanisms can be further modularized into sub-mechanisms or that mechanisms can be merged. The inquiry-mechanism 2 synchronizes the communication between the forum and the plants and converts the inquires into a standardized format (e.g. XML), which is used in the forum to represent data and information. For example, the inquiry-mechanism 2 will convert an inquiry which comes in a HTML format into a XML format. The inquiry-mechanism 2 assembles all available date and forward these to the search-mechanism 3. The communication and data exchange between the components of the forum for problem solution and between plant and the forum for problem solution is depicted by arrows.

The search-mechanism 3 generates out of the transferred plant data (e.g. under which conditions did the error occur, which components are involved, parameters of involved components, environmental parameters) a search pattern. The search patterns allow a well directed search to plants, which are of the same type as the plant in which the error occurred or are similar or comparable to this plant or had already a similar error or problem. The search-mechanism 3 incorporates new plants, which contact the forum for problem solution 1, in the database 6. The search-mechanism 3 ensures that a plant will be only once incorporated and stored in the database 6 and that the data regarding a plant will be kept up to date in the database 6. The search-mechanism 3 can use methods for pattern recognition to find potential plants in the database 6. If data for a proper comparison are missing, the search-mechanism 3 will request more data from the inquiring plant. Furthermore the search-mechanism 3 synchronizes and administrates the accesses to the database 6 and ensures that the plant relevant data in the database 6 are always up to date.

The comparison-mechanism 4 compares the actual search pattern with problem patterns, stored in the database 6. The problem patterns contain information regarding problems of a plant or a plant component, which occurred in the past. The comparison-mechanism 4 advantageously not only finds the same problem pattern, but also finds similar problem pattern. For example, pattern recognition algorithms and fuzzy logic methods can be used to find proper problem patterns in the database 6. Thus a solution for the current problem (described in the search pattern) can be derived from the problem patterns.

The following exemplary types of data, among others, can be used to define a search pattern which will be used by the comparison-mechanism 4 to find suitable problem patterns in the database 6:

Plant or component data: type identifier, version, type of predecessor, type of successor (similarity can be present because of predecessor or successor), content of diagnosis buffer, error messages, etc.

Application data: industrial sector, area of application, used software components (versions, libraries, etc.), hardware configuration, measured values, process values, time of operation, mode of operation, maintenance activities (e.g. change of components), comments, etc.

Environmental data: For example, for machine problems: temperature, pressure, humidity etc., or for software problems: relationships of the malfunctioning component to other components, etc.

The information used to define a search pattern can be gained automatically from the affected plant or affected component and be supplemented by maintenance staff.

The found problem patterns (with an offered solution) may be prioritized according their similarity to the search pattern. For example a list can be used, which offers an ordering of the found problem patterns.

A feedback-mechanism 5 is optional. If used, the feedback-mechanism 5 can be used to assess the quality and relevance of the offered solution. The inquiring plant gives feedback about the relevance and success of the found and offered solution or solutions. The feedback-mechanism 5 determines the criteria with the highest degree of relevance, which had been used to find the problem patterns. These criteria will be used to optimize the inquiry-mechanism 2 and comparison-mechanism 4. If the inquiry-mechanism 2 or comparison-mechanism 4 uses most relevant data, the performance will likely increase.

The communication between the plant and the forum can be accomplished via the internet, intranets or other communication media. The communication can be bi-directional or unidirectional. A bi-directional communication between the forum and the plant allows the forum to have access to knowledge which is on the plant or on plant components. Therefore decentralized knowledge can be used by the forum for problem solutions. If the communication between the plant and the forum should be highly secure, advantageously unidirectional communication can be used. In this embodiment, the plant or the plant component is the active part of the communication, this means that the plant or the plant component does establish the communication and can transfer data to the forum. The forum can not establish a connection to the plant or the plant component. This unidirectional communication however, does not enable that the forum has access to a plant or a plant component. Therefore this embodiment does not allow the forum to use decentrally stored local knowledge for the solution finding. For example, firewalls can be used to establish unidirectional connections. Those skilled in the art understand that there are many ways to establish a suitable communication link between the forum and the plant.

An advantageous aspect of the invention is that it enables the establishment of a relationship between customers (e.g. plant operators) and also between customers and suppliers (e.g. service provider).

Another advantageous aspect of the invention is that it does not only provide solutions based on a one-to-one data comparison but also provides similar solutions, since the comparison-mechanism 4 does also take into account similar search and problem patterns.

A further advantageous aspect of the invention is that it is based on an ample variety of data and information, since third party plants and components are taken into account and also environmental data regarding a plant are taken into account. Therefore the invention enables use of statistical diagnosis methods and statistical process control (SPC) methods, among others. Therefore anticipatory methods and mechanisms for diagnosis and error prediction can be used in a plant or plant component. Only one plant or only one component would provide statistically sufficient numbers. Different plants often use the same components (e.g. machines, drives, controls, PLC).

An additional advantageous aspect of the invention is that the database 6 can automatically be updated, enhanced or improved. For example, the forum polls the plants or components to update the information in the database 6 or the plants or plant components deliver updated information to the database 6 when new data occur. Solutions which will be stored in the database 6 can also come from other institutions or persons in the context of plants (e.g. service provider, universities, research labs).

Moreover an advantageous aspect of the invention is that the feedback-mechanism 5 performs a dynamic self optimization of the inquiry-mechanism 2 and the comparison-mechanism 4, because the feedback information will be incorporated into the database 6 and therefore the information base used by the inquiry-mechanism 2 and the comparison-mechanisin 4 will be continuously improved.

Another advantageous aspect of the invention is that manufacturer, supplier, OEMs (original Equipment Manufacturer), plant operators, producers, among others can subscribe to get dedicated problem messages or error messages. For example, this aspect of the invention can realized as a push-service (e.g. via email). Push-service means that information is automatically provided or pushed to an end user or subscriber party (e.g. operator of a plant, manufacturers, Supplier, OEM, hotline provider). This aspect of the invention offers benefits because of the provision of product related error and maintenance information.

An embodiment of the invention involves the Internet as the communication medium between the forum and the plants or plant components. Those skilled in the art understand other suitable communication media that could be used to establish a communication.

Another advantageous aspect of the invention is that the forum can be connected to or integrated in a Manufacturing Execution System (MES). Especially the diagnosis and maintenance functions of a MES system can be enhanced and improved by a connection to the forum.

A further advantageous aspect of the invention is that it can be implemented as a client server system. The forum can be implemented as a server (e.g. a web-server connected to a dataserver) and the connected plants can be implemented as clients, which deposit inquiries and solutions to the forum. The clients can provide decentral local knowledge to find a solution for a problem.

Figure 2:
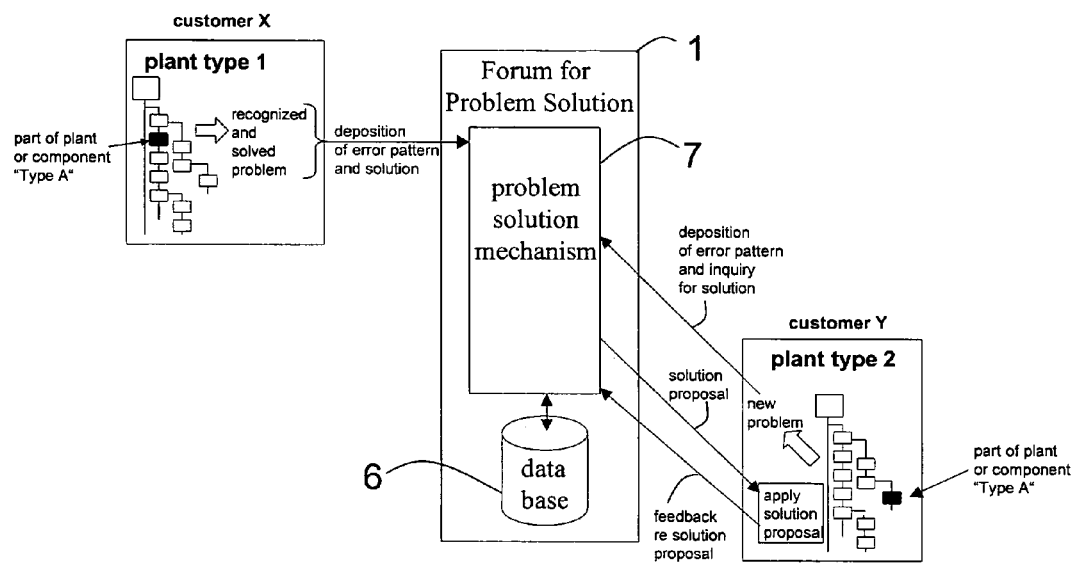
FIG. 2 is another schematic diagram of the present invention showing another embodiment of the invention.

FIG. 2 illustrates a further exemplary embodiment of the invention. Referring to FIG. 2, customer X operates a plant of type 1. The plant of type 1 has a component of type A. From time to time a problem occurs with the component of type A. Maintenance staff of customer X may analyze the problem and find a solution. The plant of type 1 deposits an error pattern of this problem and the proper solution to the forum problem solution 1. Via the problem solution mechanism 7 the error pattern and the solution will be stored in the database 6. Without the forum 1 the found solution for this problem would not be made known to third parties and therefore would only be known local at the site of customer X.

Customer Y operates a plant of type 2. Also the plant of type 2 has a component of type A, however in a different environment. Also the plant of type 2, from time to time, has problems with the component of type A. But the maintenance staff of customer Y could not find a solution for this problem. The plant of type 2 can deposit a error pattern of this problem and submit an inquiry for a solution. The forum finds a match for this error pattern in the error pattern, which the plant of type 1 has deposited before and delivers a proposal for a solution for this problem to customer Y. The customer Y can apply this offered solution to resolve his problem on component of type A. Furthermore the customer Y can give a feedback regarding this solution proposal to the forum. This feedback can be used to optimize the inquiry-mechanism 2 and the comparison-mechanism 4.

Especially for problems which are not or only difficult to reproduce, the forum offers advantages to the involved parties. For example, special local knowledge can be made known and accessible to others.

What is claimed is:

1. A method for providing problem identification or trouble-shooting services in production plants, said method comprising the steps of:

providing a forum on a networking server for collecting solutions for problems that occur at a plurality of plants, at least some of which plants are remote from each other;

obtaining sets of problem/solution data resulting from respective problems and solutions in at least one of the plants, at least some of the sets of problem/solution data comprising identification of a component involved in a respective problem, a parameter of the component, an environmental parameter, and a solution to the respective problem;

storing respective representations of the sets of problem/solution data on a database of the networking server;

obtaining a subsequent set of problem data resulting from a subsequent problem in an inquiring one of the plants, the subsequent set of problem data comprising identification of a component involved in the problem, a parameter of the component, and an environmental parameter;

creating a search pattern from the subsequent set of problem data;

searching the database for at least one of the stored representations of the sets of plant problem/solution data that at least approximately matches criteria in the search pattern;

transferring a solution found in the searching step to the inquiring plant;

applying the solution found in the searching step to the subsequent problem in the inquiring plant;

returning feedback from the inquiring plant to the networking server, the feedback comprising an indication of relevance of the solution found and an indication of the success of the solution found;

determining, from the feedback, criteria in the search pattern with the highest relevance in finding a solution to the subsequent problem;

optimizing an inquiry mechanism and a comparison mechanism in the networking server based on results of the determining step to improve subsequent performances of the searching step to improve diagnosis and maintenance functions in the inquiring plant; and automatically polling the plurality of plants to update the problem/solution data.

2. The method according to claim 1, wherein at least some of the sets of problem/solution data comprise a plant type identifier, a type of plant predecessor and/or successor, a content of a diagnosis buffer, and at least one error message.

3. The method according to claim 2, wherein at least some of the sets of problem/solution data comprise a component type identifier, a type of component predecessor and/or successor, a content of a diagnosis buffer, and at least one error message.

\* \* \* \* \*